July 17, 1934.  C. A. BRADLEY  1,967,112
MILK BOTTLE HOLDER
Original Filed Jan. 20, 1932
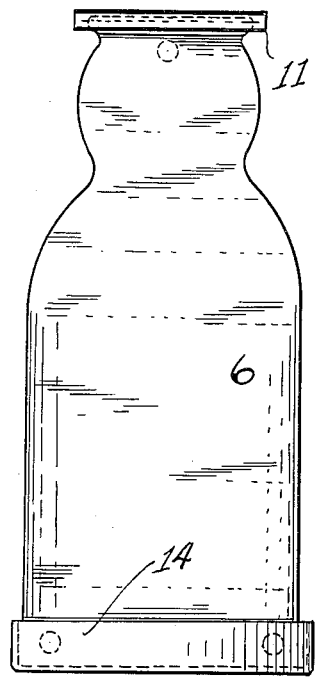
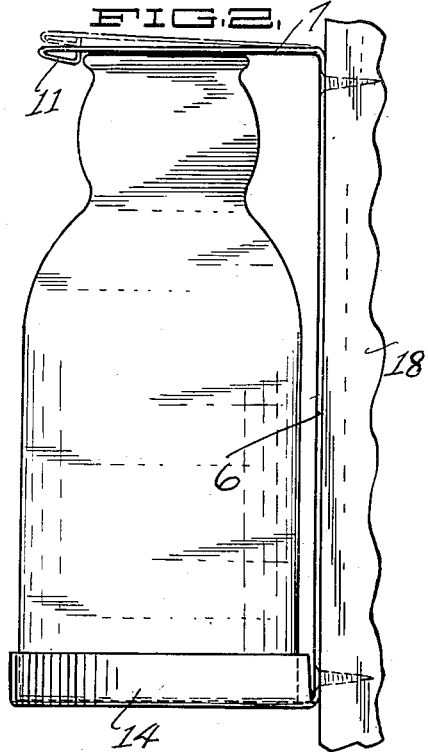
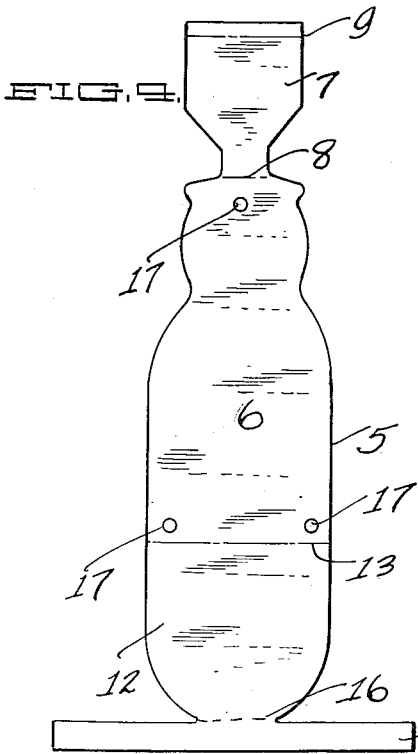
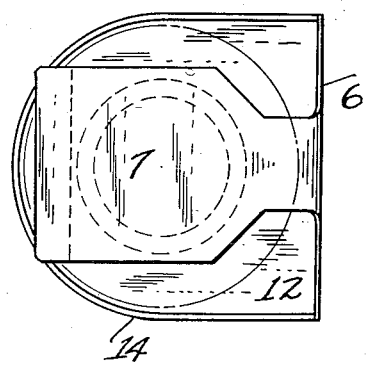
INVENTOR.
CLAUDE A. BRADLEY.
BY Victor J. Evans & Co
ATTORNEYS.

Patented July 17, 1934

1,967,112

UNITED STATES PATENT OFFICE 1,967,112

MILK BOTTLE HOLDER

Claude A. Bradley, Klamath Falls, Oreg., assignor of one-half to O. J. Johnson, Klamath Falls, Oreg.

Application January 20, 1932, Serial No. 587,767
Renewed December 5, 1933

1 Claim. (Cl. 248—65)

This invention relates to improvements in milk bottle holders and has particular reference to a holder for attachment to a support.

The principal object of the invention is to provide a device which may be attached to a support such as a portion of a house whereby an empty or full milk bottle may be deposited therein, and securely held against accidental displacement.

A further object is to produce a device which is neat in appearance.

A further object is to produce a device which may be manipulated by the bottle, in counterdistinction to an arrangement whereby both hands are needed to insert and remove the bottle.

A still further object is to produce a device which is economical to manufacture.

Other objects and advantages will be apparent during the course of the following description.

In the accompanying drawing forming a part of this specification and in which like numerals are employed to designate like parts throughout the same, Fig. 1 is a front elevation of my device, Fig. 2 is a side elevation of Fig. 1, as the same would appear when attached to a support, Fig. 3 is a top plan view of Fig. 1, and Fig. 4 is a plan view of the blank from which my device is formed.

It is customary for a milk wagon driver to deposit a bottle of milk on the door-step and in similar places, and to remove an empty bottle therefrom. It often occurs that these bottles will be knocked over by animals or persons, and often the animals will contaminate the bottles when they are within reach. Applicant has therefore designed a holder wherein the bottle will be securely held against accidental tipping, and at the same time the top of the bottle will also be protected against contamination.

In the accompanying drawing wherein for the purpose of illustration is shown a preferred embodiment of my invention, the numeral 5 designates a blank as a whole, which has a central portion 6, the contour of which simulates a milk bottle. A cover portion 7 is integrally attached to the portion 6 and adapted to be bent at right angles thereto along the line 8. The extremity of the cover portion is bent as at 9 so as to form a latch 11 capable of contacting the forward edge of the top of the milk bottle. A bottom piece 12 is integrally attached to the central portion 6 and is adapted to be bent at right angles thereto, along the line 13. A strip 14 is integrally attached to the bottom portion 12 and is adapted to be bent at right angles thereto, along the line 16. This strip 14 is of such length that it may be curved so that the ends thereof will lie along the edge of the bottom 13 and abut the lower portion of the central part. Screw holes are shown at 17 through the medium of which the device is attached to a support such as shown at 18.

When the blank 5 is bent as shown in Figs. 1 and 2, it forms a receptacle into which a milk bottle may be placed and so positioned that the upper extremity of the milk bottle will underlie the cover portion and be retained therein by the latch 11. By grasping the bottle near the top and pushing upwardly with the thumb against the latch 11, the bottle may be readily tipped and removed from the holder. In placing a bottle in the holder the bottom of the bottle is brought to rest in the bottom of the holder and the top is moved beneath the cover portion which will cam upwardly and then snap over the front edge of the bottle.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without department from the spirit of the invention or the scope of the subjoined claims.

Having thus described my invention, I claim:—

In a device of the character described, a holder comprising a central portion the contour of which simulates a milk bottle, a cover portion formed integral therewith and bent at right angles to said central portion, a bottom portion formed integral with said central portion and bent at right angles thereto, a latch formed on said cover portion and embodying a resilient strip having a down-turned bead formed on its free end, said latch being capable of engaging the top edge of a milk bottle, and a strip formed integral with said bottom portion and bent at right angles thereto, the ends of said strip being curved to lie parallel to the margin of said bottom portion to provide a retaining rim for the bottom of said bottle.

CLAUDE A. BRADLEY.